Patented Nov. 13, 1934

UNITED STATES PATENT OFFICE 1,980,966

SUBSTITUTED ALKYLPHENOLS AND METHOD OF PRODUCING THE SAME

Frederick F. Blicke, Ann Arbor, Mich., assignor to Regents of the University of Michigan, Ann Arbor, Mich., a corporation of Michigan No Drawing. Application February 28, 1933, Serial No. 659,024

10 Claims. (Cl. 260—154)

My invention relates to substituted alkylphenols and the method of producing the same. My invention has to do, more particularly, with the production of 4-alkylphenols, having substituents replacing one or more of the hydrogen atoms.

In general, it is the object of my invention to provide new products having high phenol coefficients, low toxicity and valuable therapeutic properties, which products will have utility because of their antiseptic and germicidal properties.

In general, my invention relates to new substitution products of 4-alkyphenols, containing more than two carbon atoms in the alkyl group, and which possess substituents, preferably nuclear substituents, in the 2 or 2, 6 positions.

It is known that 4-alkylphenols are potent germicides. It is also known that the introduction of such nuclear substituents as chlorine or bromine, augment the germicidal action of a phenol, but, heretofore, no 4-alkylphenol having such nuclear substituents as chlorine or bromine, has been made, which had a marked germicidal effect. My invention relates to the preparation of new products having in general a formula expressed as follows:

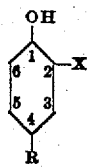

in which the substituent indicated by "X" may be any one of the group including the halogens, CN, $NO_2$, and HgOH, and the alkyl radical, indicated by "R" and having the general formula $$C_nH_{2n+1},$$

may be any of these alkyl radicals in which $n$ is greater than 2. In other words, I propose to prepare 4-alkylphenols in which the alkyl group contains more than two carbon atoms and has a nuclear substituent, in the 2 position, of the group above indicated.

In many cases the formation of such a product will take place simultaneously with the formation of a similar product, in which the substituents will be in the 2, 6 positions, as indicated by the following formula:

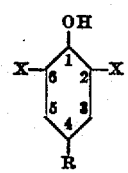

I contemplate as within the scope of my invention 4-alkylphenols having a nuclear substituent in the 2 position, or nuclear substituents in the 2, 6 positions, or a mixture of such products. Zincke, Schneider and Emmerich (Ann., 328, 277 (1903)) have heretofore described the production of 2-chloro-4-methylphenol, but no germicidal tests were conducted by them on this substance. Tests have shown that it possesses a relatively low phenol coefficient and does not have marked germicidal powers.

My research has shown that, in general, the phenol coefficient increases with the number of carbon atoms in the alkyl group and that, where the alkyl group has less than three carbon atoms, the phenol coefficient is low and the germicidal powers of the product are not marked. My invention, therefore, is restricted to substituted 4-alkylphenols containing more than two carbon atoms in the alkyl group, as these appear to be the products having marked germicidal powers. The alkyl group may be of the straight or of the branched chain type.

I believe that substitution, in the 2 or 2,6 positions in the 4-alkylphenols containing more than two carbon atoms in the alkyl group, of any nuclear substituent, of the group including the halogens, CN, $NO_2$, and HgOH, will result in an increase in the phenol coefficient and yield products having marked germicidal powers, but, at this time, I have not yet investigated the germicidal powers of any of these substitution products other than those in which the nuclear substituent is chlorine.

The following specific example illustrates one method by means of which I have obtained 2-chloro-4-n-heptylphenol: 48 g. of 4-n-heptylphenol are mixed with 34 g. of sulfuryl chloride and after five days the material is distilled directly or it may first be washed free from halogen compounds with sodium bicarbonate solution and the chlorophenol purified by distillation. The product, 2-chloro-4-n-heptylphenol is ordinarily obtained as a liquid which is practically colorless, odorless and tasteless and which boils at 290–291° C. under about 738 mm. pressure. The solid alpha naphthoate produced from this compound melts at 45–47° C. The product, 2-chloro-4-n-heptylphenol, is of very low toxicity and has a phenol coefficient of about 666 measured by the Reddish method now officially recognized by the Food, Drug and Insecticide Administration of the Department of Agriculture.

If the amount of sulfuryl-chloride used is increased, there will result a mixture of 2,6 dichloro-4-n-heptylphenol and 2-chloro-4-n-heptylphenol. If the amount of sulfuryl chloride is increased to more than two molecular equivalents, that is, in the example given, is in excess of 68 g., the resulting product will be substantially all 2,6 dichloro-4-n-heptylphenol. Other chlorinating agents or chlorine itself may be used instead of sulfuryl chloride.

I have obtained 2-chloro-4-n-hexylphenol by the following method: 44 g. of 4-n-hexylphenol are mixed with 34 g. of sulfuryl chloride and after five days the material is washed with sodium bicarbonate solution and the 2-chloro-4-n-hexylphenol purified by distillation. The product is ordinarily obtained as a liquid, which is practically colorless, odorless and tasteless and boils at 275–276° C. under about 740 mm. pressure. The solid alpha naphthoate produced from this compound melts at 43–45° C. The product, 2-chloro-4-n-hexylphenol, has a phenol coefficient of about 444, measured by the Reddish method. It has very low toxicity.

In the following table, I have given the boiling points, the melting points of the corresponding alpha-napthoates, and the phenol coefficients (determined by the Reddish method) of the various 2-chloro-4-n-alkylphenols, which I have investigated:

2-chloro-4-n-alkylphenols

| (B.P. ° C.) | Naphthoates M.P. ° C. | Phenol coefficient |
|---|---|---|
| Propyl 226–227 (741 mm.) | 71–73 | 31 |
| Butyl 243–244 (735 mm.) | 44–46 | 115 |
| Amyl 259–260 (740 mm.) | 63–65 | 333 |
| Hexyl 275–276 (740 mm.) | 43–45 | 444 |
| Heptyl 290–291 (738 mm.) | 45–47 | 666 |

In comparison with the foregoing, tests have shown that the phenol coefficients of 2-chloro-4-methylphenol and 2-chloro-4-ethylphenol are only about 8.7 and 17.7, respectively.

The substituted alkylphenols of my invention may be incorporated with other medicaments, or may be used dissolved in dilute alcohol, dilute alkali or other suitable solvent. Furthermore, they may be used in the form of esters, ethers or salts.

I am aware that the products and methods described herein may be varied considerably without departing from the spirit of my invention, and, therefore, I claim my invention broadly as indicated by the appended claims.

What I claim is:

1. A new product consisting of a 4-alkylphenol containing more than five carbon atoms in the alkyl group and halogen substituents in the 2, 6 positions.

2. A new product consisting of 2-chloro-4-n-heptylphenol, said product being a practically colorless, tasteless and odorless liquid, boiling at about 290° C. under a pressure of 738 mm. and having a phenol coefficient exceeding 500.

3. A new product consisting of 2-chloro-4-n-hexylphenol, said product being a practically colorless, tasteless and odorless liquid, boiling at about 275° C. under a pressure of 740 mm. and having a phenol coefficient exceeding 350.

4. The process of producing compounds having high phenol coefficients comprising the treatment of a 4-alkylphenol, having more than five carbon atoms in the alkyl group, with a reagent capable of introducing a halogen substituent in place of one of the hydrogen atoms.

5. The process of producing compounds having high phenol coefficients comprising the treatment of a 4-alkylphenol, having more than five carbon atoms in the alkyl group, with a reagent capable of replacing one of the hydrogen atoms of the benzene ring by a halogen substituent.

6. The process of producing a compound having a high phenol coefficient comprising subjecting 4-n-heptylphenol to reaction with sulfuryl chloride.

7. The process of producing a compound having a high phenol coefficient comprising mixing 4-n-heptylphenol and sulfuryl chloride, allowing the mixture to stand until the reaction is substantially effected and eliminating any remaining sulfuryl chloride.

8. The process of producing a compound having a high phenol coefficient comprising mixing 4-n-heptylphenol with from one to three molecular equivalents of sulfuryl chloride, and allowing the mixture to stand until reaction is substantially effected.

9. The process of producing a compound having a high phenol coefficient comprising subjecting 4-n-hexylphenol to reaction with sulfuryl chloride.

10. The process of producing a compound having a high phenol coefficient comprising mixing 4-n-hexylphenol with from one to three molecular equivalents of sulfuryl chloride, and allowing the mixture to stand until reaction is substantially effected.

FREDERICK F. BLICKE.

DISCLAIMER 1,980,966.—*Frederick F. Blicke*, Ann Arbor, Mich. SUBSTITUTED ALKYLPHENOLS AND METHOD OF PRODUCING THE SAME. Patent dated November 13, 1934. Disclaimer filed October 29, 1936, by the assignee, *Regents of the University of Michigan;* the exclusive licensee, *Frederick Stearns and Company,* consenting and concurring.

Hereby enters this disclaimer to claims 1, 4, and 5 in said specification.

[*Official Gazette November 24, 1936*]

chlorine itself may be used instead of sulfuryl chloride.

I have obtained 2-chloro-4-n-hexylphenol by the following method: 44 g. of 4-n-hexylphenol are mixed with 34 g. of sulfuryl chloride and after five days the material is washed with sodium bicarbonate solution and the 2-chloro-4-n-hexylphenol purified by distillation. The product is ordinarily obtained as a liquid, which is practically colorless, odorless and tasteless and boils at 275–276° C. under about 740 mm. pressure. The solid alpha naphthoate produced from this compound melts at 43–45° C. The product, 2-chloro-4-n-hexylphenol, has a phenol coefficient of about 444, measured by the Reddish method. It has very low toxicity.

In the following table, I have given the boiling points, the melting points of the corresponding alpha-napthoates, and the phenol coefficients (determined by the Reddish method) of the various 2-chloro-4-n-alkylphenols, which I have investigated:

*2-chloro-4-n-alkylphenols*

| (B.P. ° C.) | Naphthoates M.P. ° C. | Phenol coefficient |
|---|---|---|
| Propyl 226–227 (741 mm.) | 71–73 | 31 |
| Butyl 243–244 (735 mm.) | 44–46 | 115 |
| Amyl 259–260 (740 mm.) | 63–65 | 333 |
| Hexyl 275–276 (740 mm.) | 43–45 | 444 |
| Heptyl 290–291 (738 mm.) | 45–47 | 666 |

In comparison with the foregoing, tests have shown that the phenol coefficients of 2-chloro-4-methylphenol and 2-chloro-4-ethylphenol are only about 8.7 and 17.7, respectively.

The substituted alkylphenols of my invention may be incorporated with other medicaments, or may be used dissolved in dilute alcohol, dilute alkali or other suitable solvent. Furthermore, they may be used in the form of esters, ethers or salts.

I am aware that the products and methods described herein may be varied considerably without departing from the spirit of my invention, and, therefore, I claim my invention broadly as indicated by the appended claims.

What I claim is:

1. A new product consisting of a 4-alkylphenol containing more than five carbon atoms in the alkyl group and halogen substituents in the 2, 6 positions.

2. A new product consisting of 2-chloro-4-n-heptylphenol, said product being a practically colorless, tasteless and odorless liquid, boiling at about 290° C. under a pressure of 738 mm. and having a phenol coefficient exceeding 500.

3. A new product consisting of 2-chloro-4-n-hexylphenol, said product being a practically colorless, tasteless and odorless liquid, boiling at about 275° C. under a pressure of 740 mm. and having a phenol coefficient exceeding 350.

4. The process of producing compounds having high phenol coefficients comprising the treatment of a 4-alkylphenol, having more than five carbon atoms in the alkyl group, with a reagent capable of introducing a halogen substituent in place of one of the hydrogen atoms.

5. The process of producing compounds having high phenol coefficients comprising the treatment of a 4-alkylphenol, having more than five carbon atoms in the alkyl group, with a reagent capable of replacing one of the hydrogen atoms of the benzene ring by a halogen substituent.

6. The process of producing a compound having a high phenol coefficient comprising subjecting 4-n-heptylphenol to reaction with sulfuryl chloride.

7. The process of producing a compound having a high phenol coefficient comprising mixing 4-n-heptylphenol and sulfuryl chloride, allowing the mixture to stand until the reaction is substantially effected and eliminating any remaining sulfuryl chloride.

8. The process of producing a compound having a high phenol coefficient comprising mixing 4-n-heptylphenol with from one to three molecular equivalents of sulfuryl chloride, and allowing the mixture to stand until reaction is substantially effected.

9. The process of producing a compound having a high phenol coefficient comprising subjecting 4-n-hexylphenol to reaction with sulfuryl chloride.

10. The process of producing a compound having a high phenol coefficient comprising mixing 4-n-hexylphenol with from one to three molecular equivalents of sulfuryl chloride, and allowing the mixture to stand until reaction is substantially effected.

FREDERICK F. BLICKE.

DISCLAIMER 1,980,966.—*Frederick F. Blicke*, Ann Arbor, Mich. SUBSTITUTED ALKYLPHENOLS AND METHOD OF PRODUCING THE SAME. Patent dated November 13, 1934. Disclaimer filed October 29, 1936, by the assignee, *Regents of the University of Michigan;* the exclusive licensee, *Frederick Stearns and Company*, consenting and concurring.

Hereby enters this disclaimer to claims 1, 4, and 5 in said specification.

[*Official Gazette November 24, 1936*]